United States Patent [19]
Travaglini et al.

[11] Patent Number: 5,925,385
[45] Date of Patent: Jul. 20, 1999

[54] MOTION TRANSFER MECHANISM

[75] Inventors: Vince Travaglini, Etobicoke; Donald L. Hersey, Georgetown; Juan Fernando Segovia, Mississauga, all of Canada

[73] Assignee: Tradesco Mold Limited, Ontario, Canada

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/862,973

[22] Filed: May 23, 1997

[51] Int. Cl.⁶ ................................................. B29C 45/42
[52] U.S. Cl. ..................... 425/436 R; 74/99 R; 425/444; 425/556
[58] Field of Search ................................ 425/556, 436 R, 425/436 RM, 441, 443, 444, DIG. 5; 74/99 R

[56] References Cited

U.S. PATENT DOCUMENTS

| | | | |
|---|---|---|---|
| 3,604,499 | 9/1971 | Picker | 425/589 |
| 4,157,888 | 6/1979 | Sikorski | 425/444 |
| 5,135,700 | 8/1992 | Williams et al. | 425/438 |
| 5,490,772 | 2/1996 | Gaigl | 425/444 |
| 5,681,595 | 10/1997 | Travaglini | 425/444 |

*Primary Examiner*—James P. Mackey
*Attorney, Agent, or Firm*—Weingarten, Schurgin, Gagnebin & Hayes LLP

[57] ABSTRACT

The invention provides a motion transfer mechanism for transferring motion between a first and second component, the mechanism comprising an elongate track mounted to the first component, the track having a polar axis and an external actuation surface along a portion of the length of the track, the track having at least one portion of the actuation surface inclined at a predetermined spiral angle about the polar axis; track riding device, mounted to the second component in guided contacting relation with the actuation surface, for longitudinal displacement relative to the actuation surface, and for predetermined rotational displacement in response to the longitudinal displacement, the track riding device comprising: an actuating surface follower mounted within a rider housing; and biasing device disposed between the follower and the housing for resiliently urging the follower into continuous engagement with the actuation surface; track mounting device for mounting the track to the first component in predetermined axial relation relative to the track riding device; and actuating device for producing relative longitudinal displacement between the first and second components thereby transferring the longitudinal displacement into the rotational displacement of the track riding device. Preferably the follower includes sliding device for sliding the follower within the housing transversely relative to the polar axis of the track. A roller is disposed within the sliding device and the biasing device includes adjustment device for varying resilience. In a preferred embodiment, biasing device comprise a washer spring and the adjustment device comprise a shim, the track has two actuating surfaces and the housing includes two assemblies of the rollers, sliding device, springs and shims disposed in opposition relative to each other.

13 Claims, 4 Drawing Sheets

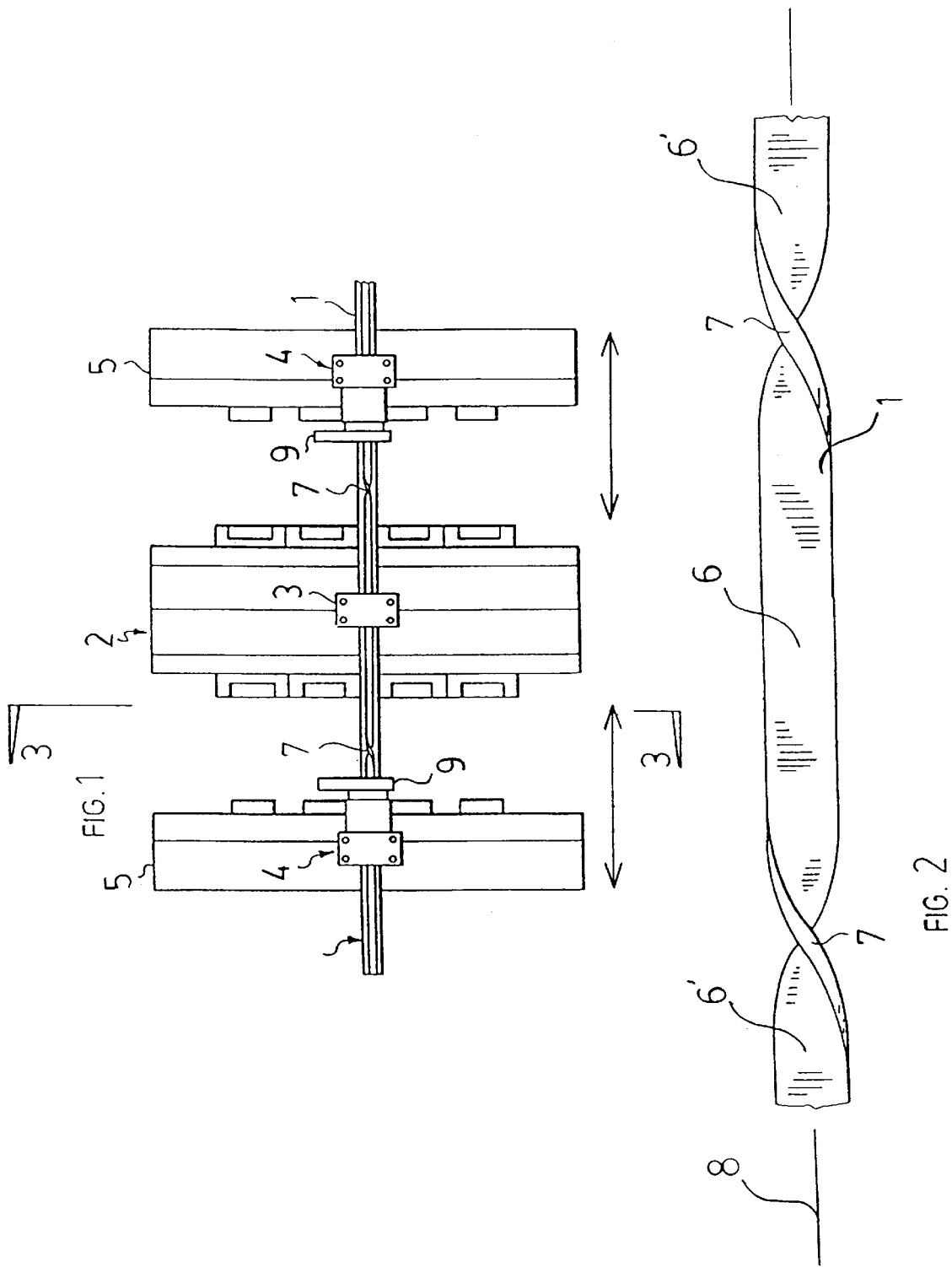

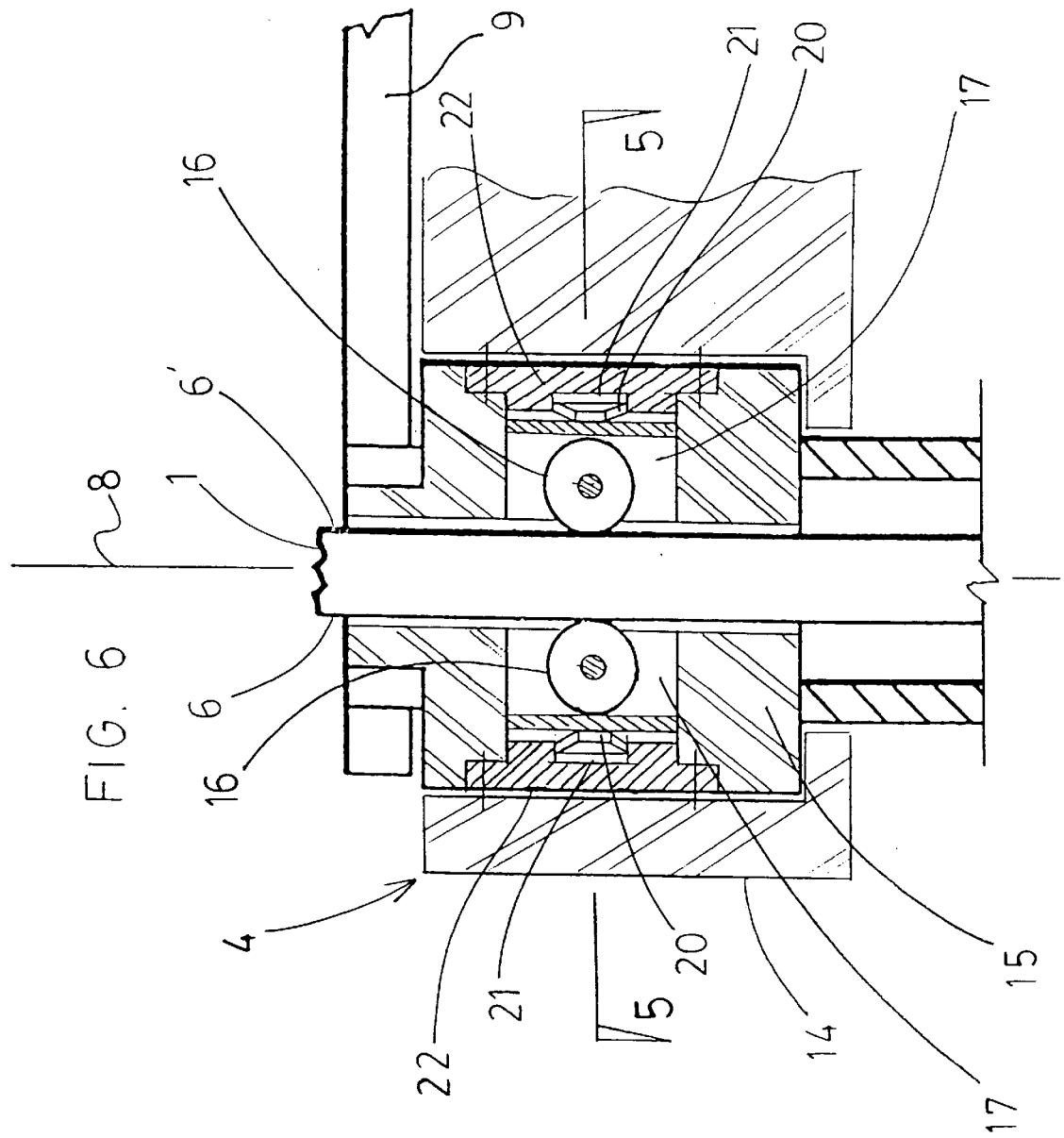

MOTION TRANSFER MECHANISM

TECHNICAL FIELD

The invention is directed to an improved motion transfer mechanism which transfers longitudinal motion between components to rotational displacement via a longitudinal track with a spiral actuating surface and rotatable track riding means following the spiral actuating surface.

BACKGROUND OF THE ART

Complex machinery, such as plastic injection molding equipment, require precise synchronised interaction between moving parts. Due to space limitations, manufacturing costs and a desire to reduce maintenance, simplicity is highly desirable yet often elusive in many complex machine designs.

A typical design response is to add independently powered pneumatic or hydraulic actuators to provide precise synchronised motions. The synchronised motion of various parts which in the past were accomplished through mechanical means are now increasingly achieved through electronic controllers, sensors and computer programming A simple mechanical motion transfer device previously developed for synchronising product transfer with opening and closing of a plastic mold, provided an elongate track with a spiral actuating surface. This prior art device is fully described in the applicant's co-pending U.S. patent application Ser. No. 08/577,648 filed Dec. 22, 1995, now U.S. Pat. No. 5,681,595. Rollers following the actuating surface were mounted in a track rider to transfer longitudinal motion of the openable mold components to rotational motion. The rotational motion operated a reciprocating product transfer device between the open mold faces.

This simple motion transfer mechanism provided an inexpensive simple means to synchronise plastic molding production without reliance on relatively expensive pneumatic actuators and electronic controls.

From experience, several disadvantages have arisen in respect of this type of device. The use of hard steel rollers to follow a spiral path on a hardened steel track actuating surface results in extremely high wear and vibration. The vibration and wear effectively render the device impractical in some applications since downtime and parts replacement may eliminate the advantages achieved from the simplicity of the device.

The rollers, riding rapidly on the actuating surface, encounter severe impact loads when they engage the spiral actuating surface and force the track rider to rotate quickly. The rapid impact of the rollers engaging the spiral transition in many cases damages rollers, bearings and produces excessive wear on the track. Such impact damage and extreme wear reduces machine accuracy, reliability and increases downtime. Cylindrical rollers riding on a flat planar actuating surface encounter a geometry problem when the planar actuating surface to spiral actuating surface transition occurs. Easing the transition from planar to spiral surface by axially lengthening the transition or slowing the mold opening and closing speed will reduce impact on the rollers. However, this solution causes a significant problem in an increased mold cycle time and lower overall rate of production.

Close engagement between the actuating surface of the track and rollers of the track rider is essential to accurate and reliable machine synchronisation. Due to wear and impact damage, the clearance between the track and rollers may be rendered unpredictable.

Inaccuracy in machining of the track and assembly of the machine may result in further operation problems. Clearance between the rollers and track is essential for smooth operation, however, inaccuracies may produce jamming or loose engagement. The accuracy of the machine operation is thus compromised.

It is desirable therefore to produce a simple mechanical motion transfer device which can compensate for some inaccuracy in construction, and which can withstand the impact of operation.

DISCLOSURE OF THE INVENTION

The invention provides a novel motion transfer mechanism for transferring motion between a first and second component, the mechanism comprising an elongate track mounted to said first component, the track having a polar axis and an external actuation surface along a portion of the length of the track, the track having at least one portion of the actuation surface inclined at a predetermined spiral angle about the polar axis; track riding means, mounted to said second component in guided contacting relation with the actuation surface, for longitudinal displacement relative to the actuation surface, and for predetermined rotational displacement in response to said longitudinal displacement, the track riding means comprising: an actuating surface follower mounted within a rider housing; and biasing means disposed between the follower and the housing for resiliently urging the follower into continuous engagement with the actuation surface; track mounting means for mounting the track to the first component in predetermined axial relation relative to the track riding means; and actuating means for producing relative longitudinal displacement between the first and second components thereby transferring said longitudinal displacement into said rotational displacement of the track riding means.

The provision of biasing means enables the track rider to absorb the shock of rapid impact loads, without transmitting excessive vibration and load to the roller bearings and associated machinery.

The biasing means also compensate for a limited degree of inaccuracy due to initial machining and assembly, as well as a degree of wear which is inevitable during operation.

As a result, without unduly increasing the complexity of the simple motion transfer device, the invention improves operational accuracy and reduces downtime.

Preferably the follower includes sliding means for sliding the follower within the housing transversely relative to the polar axis of the track. A roller is disposed within the sliding means and the biasing means include adjustment means for varying resilience. In a preferred embodiment, biasing means comprise a washer spring and the adjustment means comprise a shim. The track in the illustrated embodiment has two actuating surfaces and the housing includes two assemblies of said rollers, sliding means, springs and shims disposed in opposition relative to each other.

Therefore, the provision of a smoothly sliding guided action maintains machine accuracy while compensating for a degree of wear and initial construction inaccuracy. In operation, the shims can be replaced as the track wears to maintain biasing force and close engagement between the rollers and track. Through trial and error, machinists can determine the optimal shim height and resiliency of biasing means to produce improved machine accuracy. The use of solid shims and washer springs minimise vibration induced maintenance problems, which would result if threaded adjustment was provided for example.

Further details of the invention and its advantages will be apparent from the detailed description and drawings included below.

BRIEF DESCRIPTION OF THE DRAWINGS

In order that the invention may be readily understood, a preferred embodiment of the invention will be described by way of example, with reference to the accompanying drawings wherein:

FIG. 1 is a front elevation view of the motion transfer mechanism mounted to a three component openable stacked mold, with an elongate track fixed to the middle component and track riding means mounted on the outboard components for relative rotational displacement in response to the longitudinal opening and closing of the mold;

FIG. 2 is a detail elevation view of the track alone showing two actuating surfaces on opposing sides of the track;

FIGS. 5 and 6 show details of the track riding means wherein:

FIG. 5 is a transverse sectional view along line 5—5 of FIG. 6 through the track riding means showing the central track with two flat actuating surfaces, two opposing pairs of following rollers mounted in a U-shaped transversely sliding block, and resiliently biased to continuously engage the actuating surfaces with rearward washer springs and shims; and FIG. 6 is a longitudinal sectional view along line 6—6 of FIG. 5 showing mounting of the crank arm to the housing of the track riding means.

DETAILED DESCRIPTION OF PREFERRED EMBODIMENTS

Figure 4:
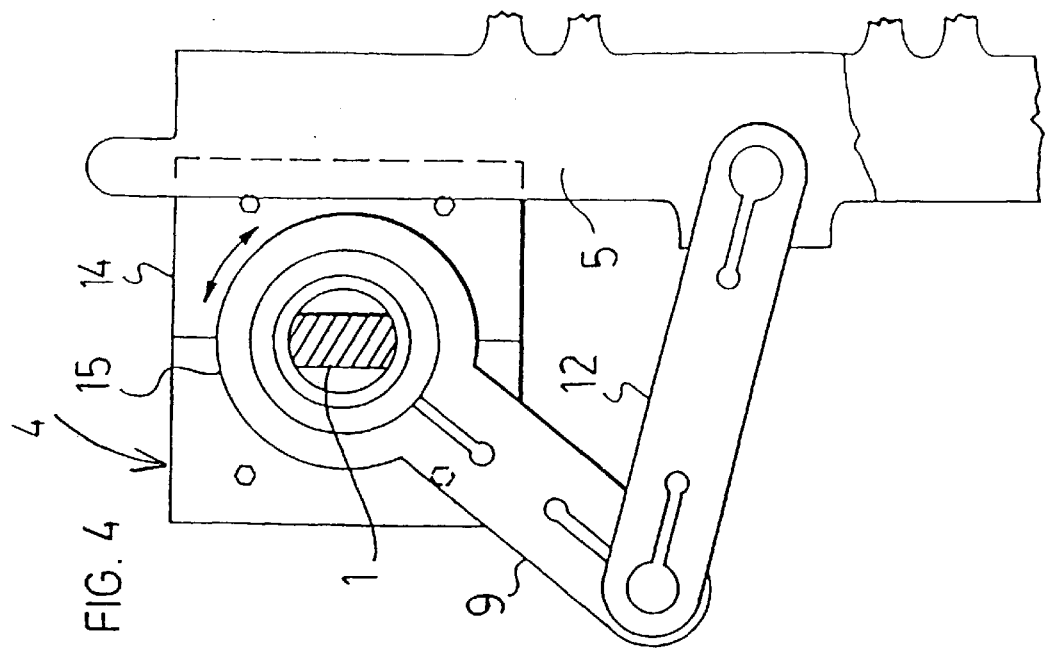
FIG. 4 is a detail view of the rotatable track riding means which drives the reciprocating crank linkage of FIG. 3.

FIG. 1 shows a front elevation view of a preferred embodiment of a motion transfer mechanism mounted to a three component openable stacked mold. The invention is applicable to other reciprocating equipment, and in particular, is also applicable for transferring motion between any first and second component.

The mold illustrated includes two mirror image mold faces between three openable die blocks. An elongate track 1 fixed to the middle component 2 with mounting block 3. The track mounting block 3 mounts or holds the track to the middle component 2 in predetermined axial relation to the moveable track riders 4. As is conventional for molding presses, actuating means, not shown, are provided for opening and closing the mold producing reciprocating relative longitudinal movement between the middle component 2 and the outboard components 5 in the direction of the arrows shown in FIG. 1.

FIG. 2 shows the elongate track 1 in detail. The track 1 is machined from a cylindrical solid rod, with a polar axis 8 and at least one external actuating surface 6. The track 1 has at least one portion of the actuating surface inclined at a predetermined spiral angle about the polar axis 8. The track 1 is of extended length sufficient to enable unimpeded opening of the press in which the stacked mold is mounted. The track riders 4 are free to pass along substantially the full length of the track 1. In the embodiment illustrated, the track 1 has two opposing actuating surfaces 6 and 6', and two spiral portions 7 to actuated both track riders 4.

Two track riders 4 are mounted on the two outboard components 5 in continuous guided contact with both of the actuation surfaces 6, 6'. The track riders 4 are fixed to the outboard die blocks 5 with an internal portion mounted on bearings for relative rotational displacement about the polar axis 8 in response to the longitudinal opening and closing of the mold in the direction of the arrows of FIG. 1. As explained in detail below, the track riders 4 travel along the track 1 longitudinally as the mold opens and closes. When the track riders 4 encounter the spiral portion 7 of the track 1, the internal portion of the track riders 4 rotate at a predetermined degree and rotational velocity in response to the longitudinal displacement along the polar axis 8.

Figure 3:
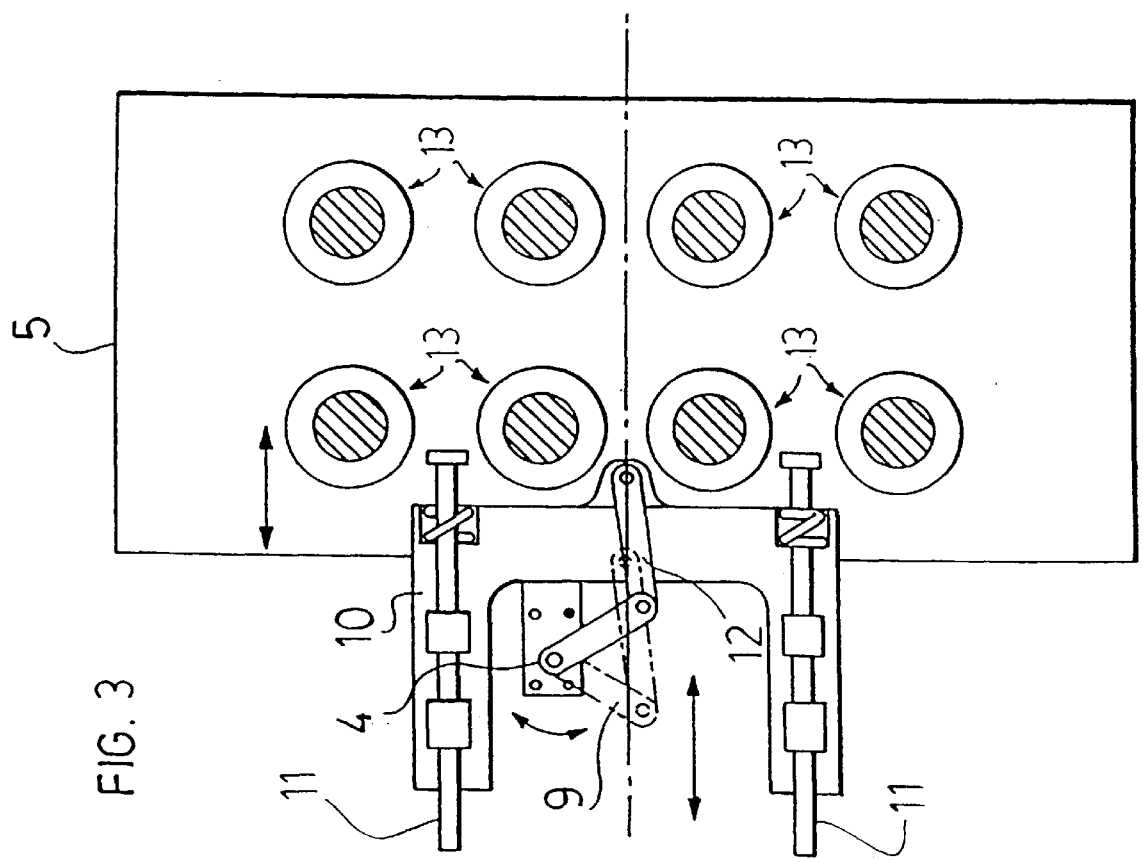
FIG. 3 is a plan view of a stacked mold surface, along line 3—3 of FIG. 1, showing a schematic representation of a reciprocating crank linkage operating a transverse retractable product transfer device, the transfer device being driven by the interaction of the track and track riding means which transfers longitudinal motion of the outboard mold components to rotational displacement of the track rider.

A crank arm 9 is secured to the internal portion of the track rider 4 extending outwardly to actuate a retractable product transfer mechanism shown in detail in FIGS. 3, and 4. When the mold faces of the mold are separated, a retractable product transfer carriage 10 sliding on support rods 11 is laterally introduced between the faces of the stacked mold in response to the rotation of the track rider 4, as indicated by arrows in FIG. 3. The crank arm 9 coacts with linkage arm 12 to advance and retract the carriage 10 enabling access between the opened mold faces to remove completed molded products 13, by vacuum means for example.

In the embodiment illustrated, the mechanism includes one product transfer carriage disposed at one side of the openable mold, however, those skilled in the art will readily appreciate that multiple transfer means may be used. The invention contemplates a mold with a plurality of mold faces with product transfer means disposed for operation between all openable mold faces of the stacked mold.

Referring to FIGS. 4 and 6, the track rider 4 includes an outer block portion 14 fixed to the outboard mold component 5. Mounted for rotation about the polar axis 8 within the outer block 14 is an internal housing portion 15. For clarity, the bearings and retaining means of the mounting are not shown since they are well within the knowledge of those skilled in the relevant art.

Centrally disposed in the track rider 4 is the elongate track 1. As shown, the track 1 is machined from a solid cylindrical rod with two opposing generally planar actuating surfaces 6, 6'. Opposing rollers 16 are mounted, within the internal housing 15 of the track rider 4, and serve as actuating surface followers maintained in continuous engagement with the actuation surfaces 6, 6'.

Figure 5:
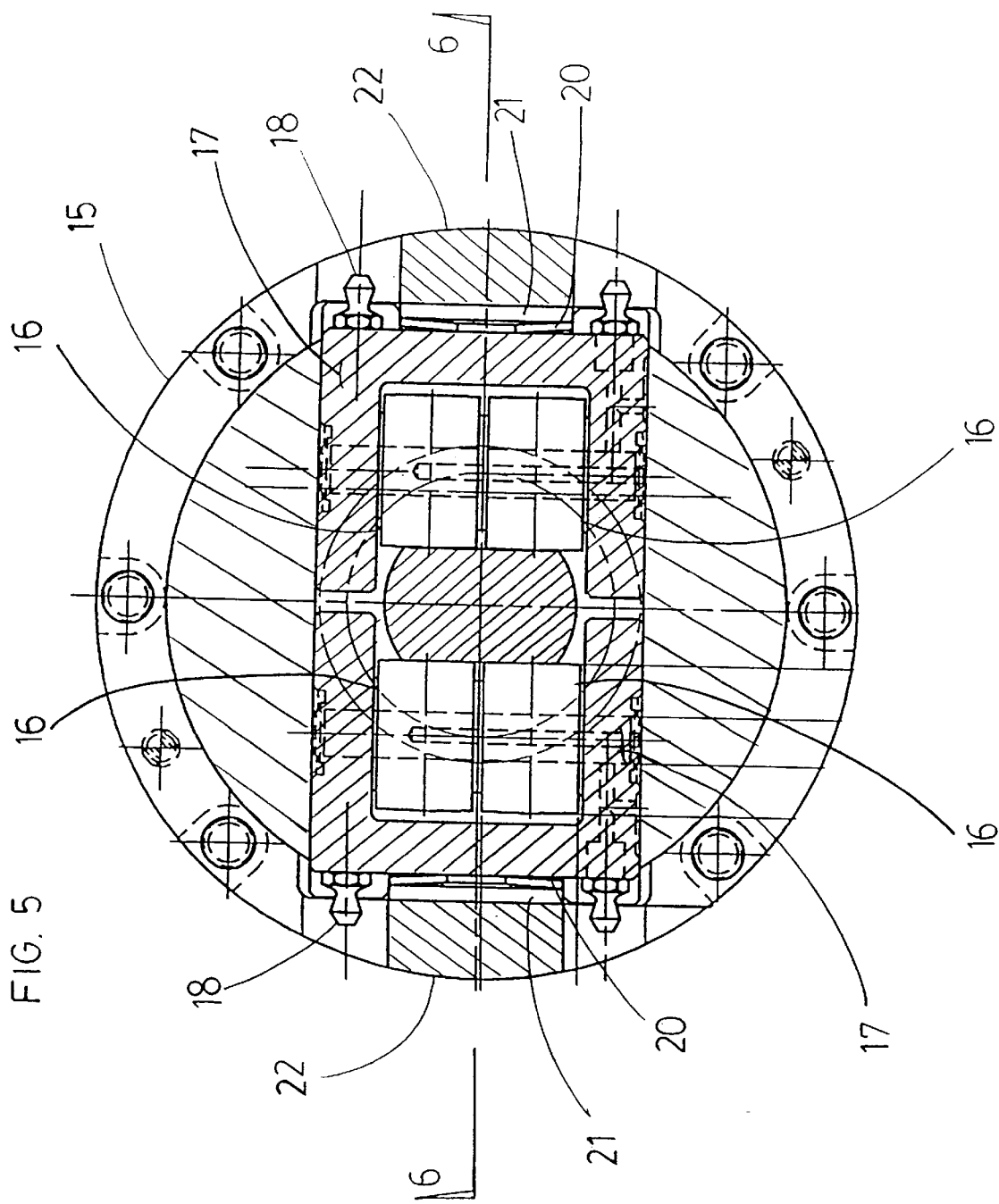

Referring to FIGS. 5 and 6, the details of the mounting of the rollers 16 are shown. The track rider 4 in general comprises: an actuating surface follower 16 mounted within the rider housing 15; and biasing means disposed between the follower 16 and the housing 15 for resiliently urging the follower 16 into continuous engagement with the actuation surfaces 6, 6'. It will be appreciated that the invention includes various mechanical equivalents and is not restricted to the use of rollers 16 or other mechanical details of the illustrated embodiment.

As shown, the actuating surface follower in addition to roller 16 includes a sliding block 17 within which the rollers 16 are disposed for allowing the rollers 16 to slide within the housing 15 transversely relative to the polar axis 8 of the track 1. Grease nipples 18 and associated grease channels provide for injection of lubricants between contact surfaces of the housing 15 and sliding block 17, to lubricate the rollers 16 on their axes, and to lubricate the actuating surfaces 6, 6'.

Biasing means are shown in the illustrated embodiment as washer springs 20, held in position with shims 21 and removable backing plate 22. The resilience of the washer springs 20 is varied or adjusted by restricting the extent of movement of the springs 20 with various thickness of shims 21 placed between the springs 20 and the backing plate 22.

To compensate for wear or inaccurate machining of the actuating surfaces 6, 6', thicker shims can be inserted. By trial and error, the optimal resilience of springs 20 can be determined and adjusted. The provision of sliding blocks 17 and adjustable springs 20 enable the track rider 4 to absorb the shock of rapid impact loads, without transmitting excessive vibration and load to the associated machinery. The biasing means also compensate for a limited degree of inaccuracy due to initial machining and assembly, as well as a degree of wear during operation.

Although the above description and accompanying drawings relate to a specific preferred embodiment as presently contemplated by the inventors, it will be understood that the invention in its broad aspect includes mechanical and functional equivalents of the elements described and illustrated.

The embodiments of the invention in which an exclusive property or privilege is claimed are defined as follows:

1. A motion transfer mechanism for transferring motion between a first and second component, the mechanism comprising:
    an elongate track mounted to said first component, the track having a polar axis and an external actuation surface along a portion of the length of the track, the track having at least one portion of the actuation surface inclined at a predetermined spiral angle about the polar axis;
    track riding means, mounted to said second component in guided contacting relation with the actuation surface, for longitudinal displacement relative to the actuation surface, and for predetermined rotational displacement in response to said longitudinal displacement, the track riding means comprising: an actuating surface follower mounted within a rider housing; and biasing means disposed between the follower and the housing for resiliently urging the follower into continuous engagement with the actuation surface;
    track mounting means for mounting the track to the first component in predetermined axial relation relative to the track riding means; and
    actuating means for producing relative longitudinal displacement between the first and second components thereby transferring said longitudinal displacement into said rotational displacement of the track riding means.

2. A mechanism according to claim 1 wherein the follower includes sliding means for sliding the follower within the housing transversely relative to the polar axis of the track.

3. A mechanism according to claim 2 wherein the follower includes a roller disposed within the sliding means.

4. A mechanism according to claim 3 wherein the biasing means includes adjustment means for varying the resilience of said biasing means.

5. A mechanism according to claim 4 wherein the adjustment means comprises means for restricting the extent of movement of the biasing means.

6. A mechanism according to claim 5 wherein the biasing means comprise a washer spring and the adjustment means comprise a shim.

7. A mechanism according to claim 6 wherein the track has two actuating surfaces and the housing includes two assemblies of said rollers, sliding means, springs and shims.

8. A mechanism according to claim 7 wherein the two actuating surfaces and two rollers are disposed in opposition relative to each other.

9. A mechanism according to claim 1 wherein the track riding means is mounted for rotational displacement about the polar axis of the track.

10. A mechanism according to claim 9 wherein:
    the first and second components comprise first and second mold faces of an openable stacked mold; and
    the track riding means coacts with retractable product transfer means, in synchronised operating relation with one of said mold faces, for introducing the transfer means between the faces of the stacked mold upon the opening thereof.

11. A mechanism according to claim 10 wherein at least one product transfer means is disposed at one side of said openable stacked mold.

12. A mechanism according to claim 11 wherein the track is of extended length sufficient to enable unimpeded opening of a press in which said stacked mold is mounted, said track riding means being free to pass along substantially the full length of said track.

13. A mechanism according to claim 12 wherein the stacked mold includes a plurality of mold faces with product transfer means disposed for operation between all openable mold faces of the stacked mold.

* * * * *

UNITED STATES PATENT AND TRADEMARK OFFICE
CERTIFICATE OF CORRECTION

PATENT NO : 5,925,385
DATED : July 20, 1999
INVENTOR(S) : Vince Travaglini, et al.

It is certified that error appears in the above-identified patent and that said Letters Patent are hereby corrected as shown below:

Assignee, "Tradesco Mold Limited", should read --Tralin Group Ltd.--.

Signed and Sealed this

Twenty-ninth Day of May, 2001

Attest:

NICHOLAS P. GODICI

*Attesting Officer*  *Acting Director of the United States Patent and Trademark Office*